United States Patent

[11] 3,568,058

| [72] | Inventor | Kiichi Komatsubara<br>Kodaira-shi, Japan |
| --- | --- | --- |
| [21] | Appl. No. | 888,132 |
| [22] | Filed | Dec. 30, 1969 |
| [45] | Patented | Mar. 2, 1971 |
| [73] | Assignee | Hitachi, Ltd.<br>Tokyo, Japan |
| [32] | Priority | Dec. 6, 1965 |
| [33] | | Japan |
| [31] | | 40/74621 |
| | | Continuation of application Ser. No. 596,634, Nov. 23, 1966, abandoned. |

[54] DEVICE FOR DETECTING SMALL MICROWAVE SIGNALS AND THE LIKE
2 Claims, 3 Drawing Figs.

[52] U.S. Cl. .................................................... 324/95,
329/161
[51] Int. Cl. ...................................................... G01r 21/06,
G01r 21/12
[50] Field of Search ........................................ 324/95, 46;
329/160, 161, 162, 200; 338/32; 307/309; 330/62

[56] References Cited
UNITED STATES PATENTS
| 2,979,668 | 4/1961 | Dunlap, Jr. .................. | 338/32X |
| --- | --- | --- | --- |
| 3,411,084 | 11/1968 | Kataoka et al. .............. | 324/95 |
| 3,001,135 | 9/1961 | Many ........................... | 324/95 |
| 3,096,494 | 7/1963 | Jacobs et al. ................. | 329/161X |
| 3,316,494 | 4/1967 | Harrison et al. ............. | 329/161 |
| 3,374,433 | 4/1967 | Harrison et al. ............. | 329/161X |
| 3,360,725 | 12/1967 | Zucker ........................ | 324/95 |

OTHER REFERENCES
Koike et al.; Microwave Measurements on the Magneto-Resistive Effect in Semiconductors; Proceedings of the Institution of Electrical Engineers; Part B; vol 109; no. 44; March 1962; pages 137— 144; copy in Sci. Lib.

Primary Examiner—Rudolph V. Rolinec
Assistant Examiner—Ernest F. Karlsen
Attorney—Craig, Antonelli, Stewart & Hill ABSTRACT: A device for detecting small signals of a microwave, millimeter wave and the like level, wherein a detector element is composed of a III—V group semiconductor compound selected from the group consisting of N-type InSb and InAs, and is conditioned so as to be in the state of the quantum limit. The device is responsive to signals having a high speed and/or a broad range of power.

PATENTED MAR 2 1971 3,568,058

INVENTOR
KIICHI KOMATSUBARA

BY Paul M. Craig, Jr.
ATTORNEY

DEVICE FOR DETECTING SMALL MICROWAVE SIGNALS AND THE LIKE

This is a streamlined continuation of application Ser. No. 596,634 filed Nov. 23, 1966, now abandoned.

The present invention relates to microwave and millimeter wave detectors using group III—V intermetallic compound semiconductors, in particular n-type InSb or n-type InAs.

High purity n-type InSb having an impurity concentration below $10^{14}$ atoms/cc. exhibits a nonlinear current-voltage characteristic due to the carrier heating effect when $kT<hwc$, where $$\omega c = \frac{eH}{m^*c}$$

(H: magnetic field intensity), i.e., in the temperature-magnetic field range of the quantum limit.

In the specification, the term "quantum limit" is used in the following sense. When a magnetic field is applied to a semiconductor, the field forces the electrons in the semiconductor to travel in circles or helices having radii of certain discrete values and the axes of the circles or helices are parallel to the field applied. Therefore, the energy of motion of these electrons in a direction perpendicular to the field is quantized in correspondence with the above-mentioned radii and their motions perpendicular to the field can be altered only in discrete steps of energy. By maintaining this semiconductor subjected to the magnetic field at a low temperature so as to make the energy of the carriers sufficiently small, all of the carriers may be in the state having the lowest the above-mentioned quantized energies, namely, in the lowest quantum state. This state is referred to as the quantum limit.

When an electric field is further applied to the semiconductor to energize the carriers in the state of the quantum limit and the electric field is very weak, the energy of the carriers is still quite small, so that the carriers remain in the state of the quantum limit. In such a case, the current flowing through the semiconductor changes nonlinearly with respect to the applied electric field (as is described in the discussion in Physical Review, Vol. 104, Nov. 4, 1956, pp. 900 through 908, by P.N. Argyres et al. entitled "Longitudinal Magneto Resistance in the Quantum Limit").

This nonlinear characteristic is considered to result from the increase of the electron temperature of the conduction electrons due to impurity scattering in the quantum limit. Under such a condition, where the impurity scattering mainly influences the nonlinear characteristic of the semiconductor, the electron temperature may be easily raised by a small electric field applied to the conduction electrons.

The invention is based upon the fact that instead of the application of said electric field, the irradiation with an external electric wave like light, infrared light, a millimeter range electric wave or a microwave range wave may be equally employed to raise the electron temperature and that said current-voltage characteristic may be controlled by applying a magnetic field to the n-type InSb element. Said effect has been found only in n-type InSb and n-type InAs up to the present, but may be found in other groups III—V, intermetallic compound semiconductors in the future.

In a single crystal of n-type InSb, conduction electrons mainly experience lattice scattering at high temperature and the impurity scattering dominates at a temperature below the temperature of liquid nitrogen (77° K.), and in particular, around the temperature of liquid helium. Said impurity scattering becomes more dominant if the temperature of the conduction electron is lowered to suppress the effect of phonon scattering and accordingly the responsibility to the external electromagnetic wave increase remarkably.

As the outside magnetic field applied to a high purity n-type InSb element is increased under the conditions that the temperature of said InSb element is kept below the value at which the impurity scattering is dominant and that said element is applied with an electric field of 0.1—1 v./cm., the state of said InSb element approaches the quantum limit. In this case, the intensity of the applied magnetic field satisfies the condition $$\frac{eH}{m^*c}\tau \geq 1$$

, where $e$ is the charge of the conduction electron, H is the intensity of the applied magnetic field, $m^*$ is the effective mass of the electron, $c$ is the velocity of light and $\tau$ is the mean energy scattering time of the electron.

Under such s condition, the condition electrons gain kinetic energy easily from the external electromagnetic wave and so the electron temperature rises. In other words, conductivity modulation may be effected by irradiating a semiconductor element in the quantum limit with an electromagnetic wave. When the element is kept in the quantum limit, the electron temperature is proportional to the inverse of the mean time of impurity scattering $\tau$im. and the rate of decrease of electron temperature due to lattice scattering is proportional to the inverse of the mean time of lattice scattering $\tau$ph.

For example, in the high purity n-type InSb having an impurity concentration below $10^{14}$ atoms/cc., the ratio of $\tau$ph. and $\tau$im. at a sample temperature below 10° K. is $$\frac{\tau ph}{\tau im} \cong 2 \times 10^4$$

; and so the electron temperature may be easily raised by the irradiation with external electromagnetic waves and thereby conductivity modulation is effected. This means that the variation of conductivity may be detected by measuring the variation of the current running through the element.

Said detection method enjoys a good sensitivity and a large S/N ratio and the conversion efficiency of 10—20db. may be achieved at 10 kg. at 1.5° K. Therefore, said method is quite powerful for detecting a small current.

The invention will be described in detail hereinbelow in conjunction with the accompanying drawings, in which:

FIG. 1 shows an example of a static characteristic of a high purity n-type InSb element and FIG. 2 shows an example of the performance characteristics obtained when a vertical magnetic field is applied to said element.

It is seen from these FIGS. that the sensitivity of said element changes with the applied magnetic field and that the condition showing a required characteristic curve may be provided without changing the element by suitably selecting the intensity of the magnetic field even when the element is irradiated with an outside electromagnetic wave having a wide range of electric power.

Now, one embodiment of the invention will be described hereinbelow for a better understanding of the invention.

Figure 1:
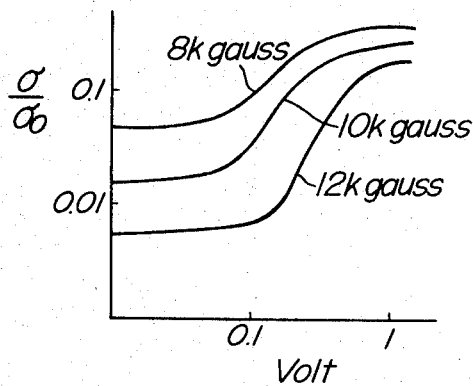
FIG. 1 shows an example of a static characteristic of a microwave detector according to the invention.
Figure 3:
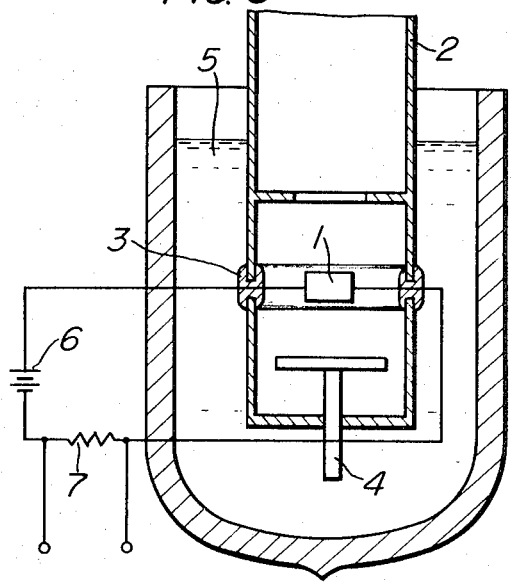
FIG. 3 illustrates an embodiment of the invention.

FIG. 3 is a schematic diagram of a microwave detector according to the invention, in which only the main parts are enlarged. In the FIG., reference numeral 1 designates an n-type InSb element in which the impurity concentration is $2 \times 10^{14}$ atoms/cc. and whose size is $1 \times 1 \times 5$ mm$^3$. Said element is placed in the cavity of a waveguide 2. Reference numeral 3 indicates an insulator for preventing the short circuit between a lead wire and the waveguide, and 4 is a short plunger for the waveguide. The cavity of the waveguide is immersed in liquid nitrogen 5 to keep the n-type InSb element in the cavity as well as the waveguide at the temperature of liquid nitrogen. Said n-type InSb element is connected to an outer series circuit consisting of means 6 for applying a voltage of 0.1—1 volt to said InSb element and a load resistance 7.

Figure 2:
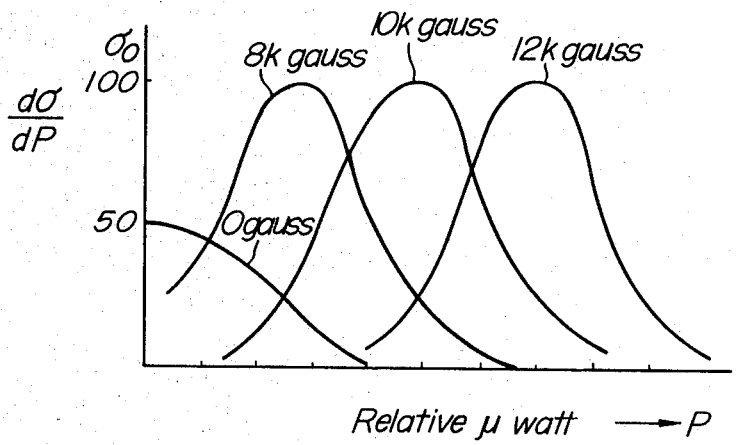
FIG. 2 shows an example of the performance characteristics of a device according to the invention.

In this embodiment, the ratio of the conductivity variation to the small electric power coming from the outer waveguide turned out to be, $$\frac{d\sigma}{dp} = (50-100) \times \sigma_0$$

where $\sigma_0$ is the conductivity in the absence of the magnetic field at the temperature of liquid helium, which was 0.2 ℧ in this embodiment. In this case, the magnetic field is applied vertically to the direction of the current running through the element and the variation of $d\sigma/dp$ with the magnetic field is shown in FIG. 2.

The same result was obtained when a high purity InAs element was used.

There are publicly known as a microwave detector a thermistor, a diode and the like. However, the detector according to the invention has a better sensitivity than conventional devices and it may be used to detect a small electromagnetic wave as well.

According to the invention, the microwave energy is given to the conduction electrons in the semiconductor element kept in the quantum limit and thereby the temperature of the conduction electron increases. In this case, since the specific heat of the conduction electron is very small, the device according to the invention responds very fast to a pulse wave and the high frequency characteristic of the device against a high frequency pulse wave is very good. Particularly, since the quantum limit may be controlled by the intensity of the magnetic field, the present detector may be used to measure, without saturation a signal wave having, a wider range of electric power, from a very small power to a high power, in comparison with known devices. In other words, sensitivity may be adjusted by controlling the intensity of the magnetic field applied to the element without saturating the detection efficiency.

I claim:
1. A device for detecting weak microwave signals and the like comprising:
 a. a semiconductor element of a III—V group compound selected from the group consisting of n-type InSb and n-type InAs, said element having an impurity concentration below about $10^{14}$ atmos/cc.;
 b. means for maintaining said element at a temperature below the temperature of liquid nitrogen;
 c. means for applying an electric field of about 0.1—1.0 v/cm. to said element;
 d. means for applying to said element a magnetic field perpendicular to said electric field in such a manner that said semiconductor element is put in the state of the quantum limit to render the conductivity of said element in the direction of said electric field nonlinear, and
 e. means for introducing a microwave energy to said element, whereby a variation in the power of said microwave energy is detected in the form of a corresponding variation in the conductivity of said element.

2. A device as claimed in claim 1, wherein means is provided for changing the intensity of said magnetic field so that the detection sensitivity $d\sigma/dp$ may be adjusted in dependence on the electric power of said microwave energy where $\sigma$ and $p$ represent the conductivity of said element and the power of said microwave signal.